United States Patent
Anderson et al.

(10) Patent No.: US 9,306,894 B1
(45) Date of Patent: Apr. 5, 2016

(54) AUTOMATIC DETECTION AND NOTIFICATION OF BACKLOGS AND DELAYS

(71) Applicant: CA, Inc., Islandia, NY (US)

(72) Inventors: James E. Anderson, Coraopolis, PA (US); William E. Boyd, Jr., McDonald, PA (US); Robert L. Carpenter, Beaver, PA (US); David R Jones, Aliquippa, PA (US); David E. Rhodes, II, Coraopolis, PA (US); Jason A. Tucker, Coraopolis, PA (US)

(73) Assignee: CA, Inc., Islandia, NY (US)

( * ) Notice: Subject to any disclaimer, the term of this patent is extended or adjusted under 35 U.S.C. 154(b) by 284 days.

(21) Appl. No.: 13/795,509

(22) Filed: Mar. 12, 2013

(51) Int. Cl.
   *G06F 15/16*   (2006.01)
   *G06F 15/173*  (2006.01)
   *H04L 12/58*   (2006.01)

(52) U.S. Cl.
   CPC ...................... *H04L 51/24* (2013.01)

(58) Field of Classification Search
   CPC ............ G06F 17/30362; H04L 49/103; H04Q 2011/0064; H04W 72/0406
   USPC ............ 709/223, 224, 227; 711/5, 148; 714/4
   See application file for complete search history.

(56) References Cited

U.S. PATENT DOCUMENTS

| | | | | |
|---|---|---|---|---|
| 5,935,218 | A  * | 8/1999  | Beyda et al. | 709/224 |
| 8,090,814 | B2 * | 1/2012  | Arroyo et al. | 709/223 |
| 8,578,076 | B2 * | 11/2013 | van der Linden et al. | 709/227 |
| 2004/0006665 | A1 * | 1/2004  | Moss | 711/5 |
| 2005/0022047 | A1 * | 1/2005  | Chandrasekaran | 714/4 |
| 2013/0326159 | A1 * | 12/2013 | Vijayan et al. | 711/148 |
| 2014/0109086 | A1 * | 4/2014  | Mizrahi et al. | 718/1 |

* cited by examiner

*Primary Examiner* — Quang N Nguyen
(74) *Attorney, Agent, or Firm* — Stevens & Showalter, LLP

(57) ABSTRACT

Managing computer resource allocation includes detecting, by one computer amongst a plurality of computers, generation of an allocation request, wherein the allocation request requests exclusive access, by the one computer, to a computer resource shared between the plurality of computers; determining a period of time that has elapsed since detection of the generation of the allocation request; determining that a delay has occurred when the period of time has exceeded a predetermined threshold; and then, transmitting, by the one computer, a delay message based on the delay to each of the plurality of computers.

34 Claims, 5 Drawing Sheets

AUTOMATIC DETECTION AND NOTIFICATION OF BACKLOGS AND DELAYS

BACKGROUND

The present disclosure relates to user data access, and more specifically, to serialized data access.

One aspect of many modern computer systems is that they may use large numbers of physical, or virtual, input/output devices to allow sequential digital data archiving and back-up such as that required, for example, by government-mandated regulations or other business goals. Each of these systems may include a number of respective applications such that a variety of different applications are attempting to exclusively access the same input/output devices at any one time.

One approach to preventing corruption from occurring when data is being written to these input/output devices is to serialize access to the input/output devices. Such serialization can be accomplished using software on each of the computer systems that coordinate access to the input/output devices. In particular, respective requests to access one or more input/output devices from the various applications can be arranged in a queue such that allocation of the input/output devices occurs sequentially in the order of the requests in the queue. In this way, each request waits for the requests that are earlier in the queue to finish.

BRIEF SUMMARY

According to one aspect of the present disclosure, a method of managing computer resource allocation includes detecting, by one computer amongst a plurality of computers, generation of an allocation request, wherein the allocation request requests exclusive access, by the one computer, to a computer resource shared between the plurality of computers; determining a period of time that has elapsed since detection of the generation of the allocation request; determining that a delay has occurred when the period of time has exceeded a predetermined threshold; and then, transmitting, by the one computer, a delay message based on the delay to each of the plurality of computers.

According to another aspect of the disclosure, a computer program product for managing computer resource allocation includes a computer readable storage medium having computer readable program code embodied therewith. This computer readable program code includes computer readable program code configured to detect, by one computer amongst a plurality of computers, generation of an allocation request, wherein the allocation request requests exclusive access, by the one computer, to a computer resource shared between the plurality of computers; computer readable program code configured to determine a period of time that has elapsed since detection of the generation of the allocation request; computer readable program code configured to determine a delay has occurred when the period of time has exceeded a predetermined threshold; and computer readable program code configured to transmit a delay message based on the delay to each of the plurality of computer.

According to yet another aspect of the disclosure, a system for managing computer resource allocation that includes a processor coupled with a memory and the memory comprising code executable by the processor, said code configured, when executed, to manage computer resource allocation. When executed, the code detects, by one computer amongst a plurality of computers, generation of an allocation request, wherein the allocation request requests exclusive access, by the one computer, to a computer resource shared between the plurality of computers; determines, by the one computer, a period of time that has elapsed since detection of the generation of the allocation request; determines, by the one computer, a delay has occurred when the period of time has exceeded a predetermined threshold; and transmits, by the one computer, a delay message based on the delay to each of the plurality of computers.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
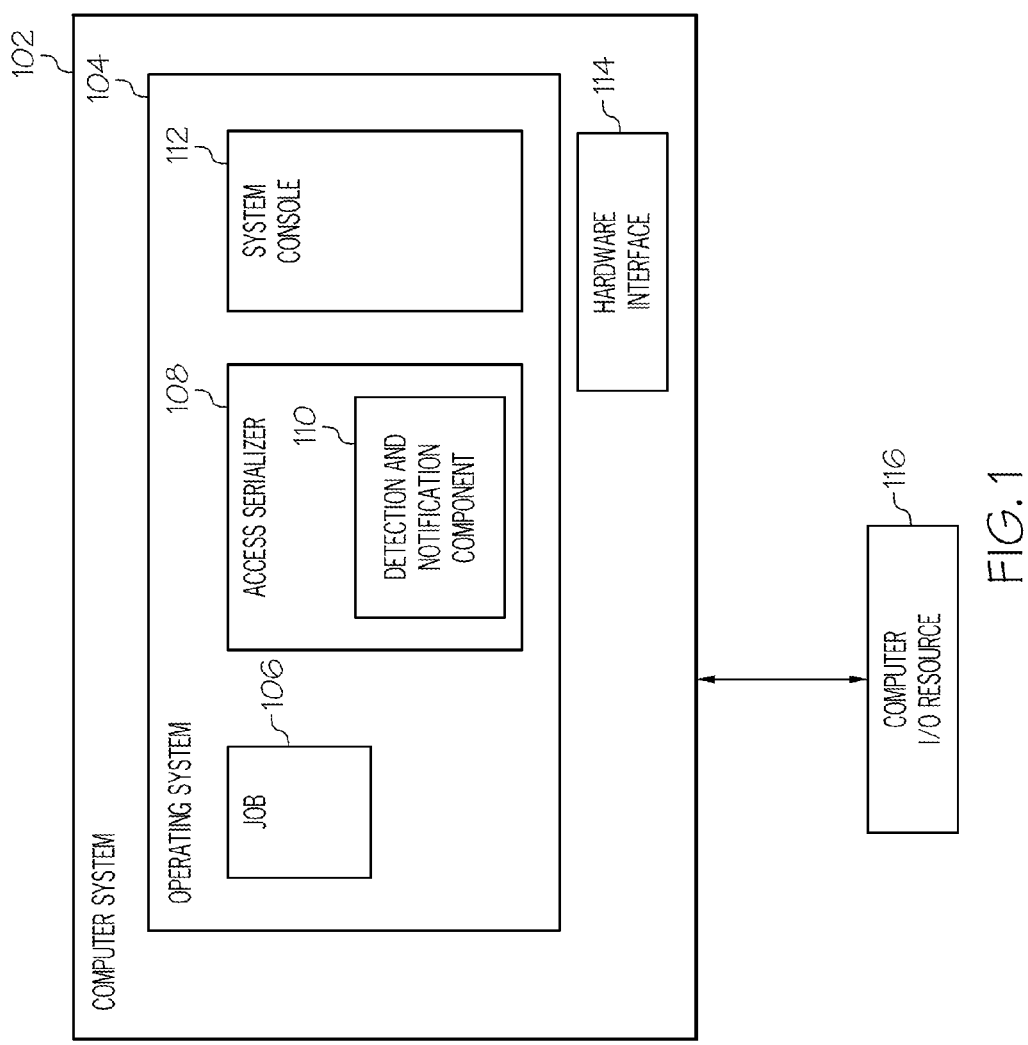
FIG. 1 illustrates an example computing system that may be deployed in accordance with the principles of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including, MAINFRAME Assembler, an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring to FIG. 1, an example computing system 102 is illustrated that may be deployed in accordance with the principles of the present disclosure. The computer system 102 may, for example, have an operating system 104 in which one or more software applications may execute. The computer system 102, for example, may be a mainframe system in which a job 106 can execute. Thus, an operator can define a particular job 106 (e.g., using a job control language (JCL) script) that causes one or more applications to execute and also specifies how to handle any input and output for these applications.

For example, output resulting from the job 106 may be passed through a hardware interface 114 to an input/output (I/O) resource 116. The I/O resource 116 may, for example, be a printer, a display such as a terminal or a console window, a hard-drive, an optical drive, or a tape drive. One of ordinary skill will recognize that such resources can be actual physical devices or a physical device logically organized as various virtual devices.

One example application that may be executing on the computer system 102 is an access serializer 108. The access serializer 108 manages how and when a job 106 may access the I/O device 116. In particular, the I/O resource 116 may be a shared resource as described in more detail with respect to FIG. 2. The access serializer 108 may coordinate access to the shared I/O resource 116 amongst a plurality of different computer systems that all are attempting to access the shared I/O resource 116. In operation, the job 106 may attempt to access the shared I/O resource 116 and the access serializer 108 detects that attempt. The access serializer 108 can then exchange messages with other computer systems sharing the I/O resource 116 to coordinate when the shared I/O resource 116 can be allocated to handle the request from the job 106.

Another application that may be executing on the computer system 102 is a system console 112 that can receive input from an operator (e.g., from a keyboard or mouse), receive input from other inter-networked computer systems, and display messages to an operator. The messages that are displayed may relate to an application (e.g., 106, 108) executing on the computer system 102 or relate to external messages received from other computer systems.

The access serializer 108 prevents two applications from concurrently allocating a given shared I/O resource 116. Thus, respective requests by different applications to access the shared I/O resource 116 are serialized such that the shared I/O resource 116 is allocated to handle only one request at any moment in time. Once that request is handled, a next pending request is handled and this process repeats until all pending requests for the shared I/O resource 116 are handled.

Thus, there may be instances in which there is a delay between the time the job 106 requests access to the shared I/O resource 116 and the time that this resource is allocated to the job 106. In particular, the job 106 may request access to the shared I/O resource 116 and this request is detected, or handled, by the access serializer 108. The access serializer 108 generates an allocation request for the I/O resource 116 that is coordinated with any other computer systems that share access with the I/O resource 116. The access serializer 108 recognizes when the shared I/O resource 116 becomes available to handle this allocation request, and controls the exchange of data between the job 106 and the shared I/O resource 116.

The access serializer 108 can include a detection and notification component 110 that detects any delay that may occur once the access serializer 108 generates an allocation request for the shared I/O resource 116. This delay can represent the time between when the access serializer 108 requests allocation of the I/O resource 116 and when that resource is allocated to handle that request. Some amount of delay will likely occur within the normal usage of the computer system 102 and the shared I/O resource 116, especially for a heavily used I/O resource 116. However, a predetermined threshold can be specified that represents a delay period that likely indicates that there may be some type of malfunction with the I/O resource 116 or with an application that is trying to access the I/O resource. Thus, once a delay is recognized that exceeds this predetermined threshold, the detection and notification component 110 can generate a message about the delay and display it within the system console 112 or transmit it to other computer systems.

Figure 2:
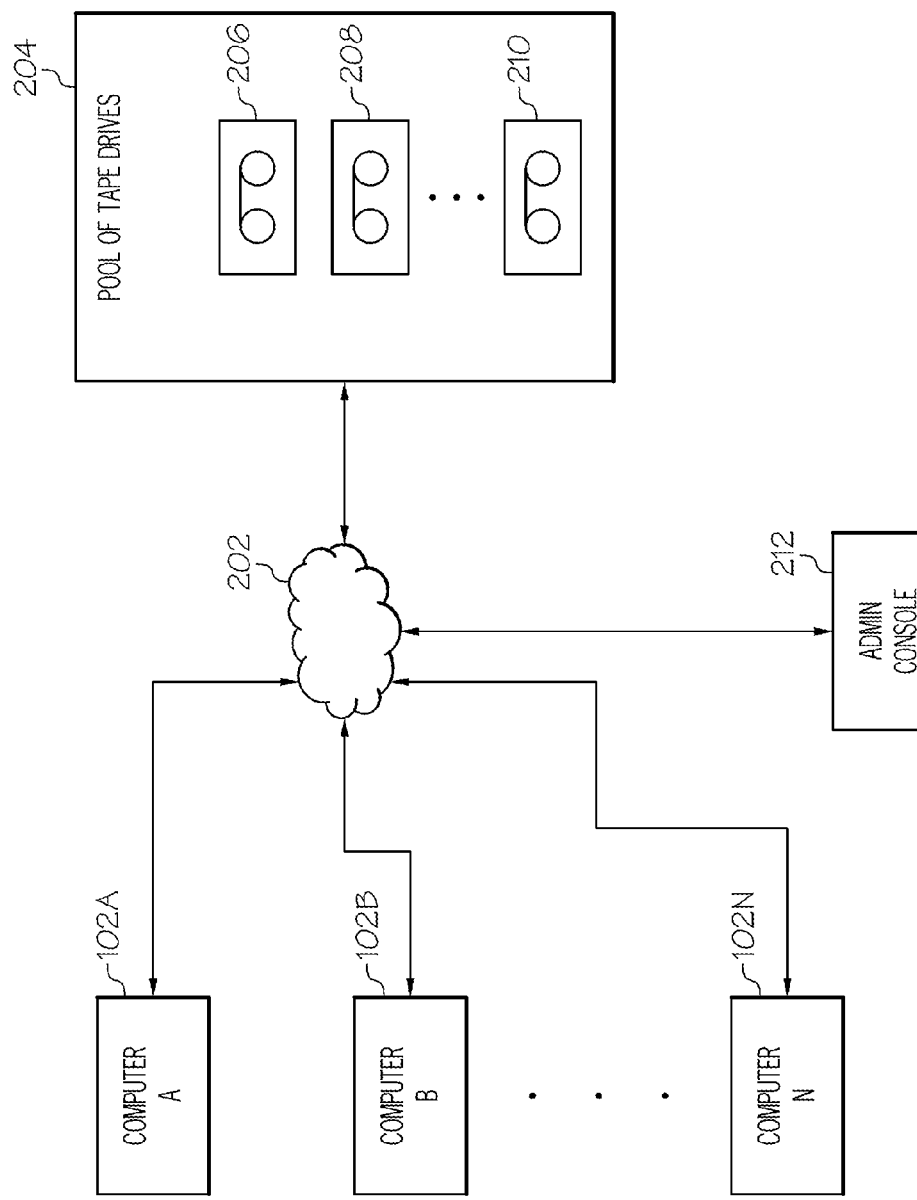
FIG. 2 depicts an example computing environment in which multiple computing systems, as shown in FIG. 1, have access to shared computer resources in accordance with the principles of the present disclosure.

FIG. 2 depicts an example computing environment in which multiple computing systems, as shown in FIG. 1, have access to shared computer resources in accordance with the principles of the present disclosure. In the environment of FIG. 2, a plurality of computer systems 102A, 102B, 102N can be deployed that are similar to the computer system 102 described with respect to FIG. 1. These computer systems 102A, 102B, 102N can be networked 202 together so as to share an I/O resource 204. In particular the I/O resource 204 may be a pool of individual tape drives 206, 208, 210. A first job executing on computer A 102A may cause generation of an allocation request for tape drive 206 while a second job executing on computer B 102B may cause generation of its own allocation request for tape drives 206 and 208. Because these two allocation requests involve at least some overlap, both allocations cannot concurrently occur without likely resulting in data corruption. Accordingly, a respective access serializer on each of computer A 102A and computer B 102B coordinate over the network 202 to serialize the allocation of the I/O resource 204 so that both allocations can occur, but occur sequentially.

A copy of the access serializer 108 runs on each computer 102A, 102B, 102N that is sharing access to the I/O resource 204. Each access serializer 108 detects when an allocation request occurs on its respective computer, and makes the allocation requester (e.g., a job 106) wait until the access serializer 108 can validate that no job on any of the computers (e.g., 102A, 102B, 102N) is currently attempting to allocate, or has already allocated, the I/O resource 204. This determination can, for example, be performed by "polling" all the other access serializers on the other computers. One example is to exchange a message that describes which of the devices 206, 208, 210 of the I/O resource 204 are available or unavailable for access. The message may also include queue information that tracks the order in which access serializers have requested access to a particular device or devices.

If a device is available for access, then the access serializer 108 allows the allocation requester to utilize the device or the I/O resource 204. If the device is not available for access, then the access serializer can wait a predetermined period of time and try again later; and keep retrying until the device becomes available. Alternatively, the coordination and messages between access serializers may include queue information, as mentioned above, such that when an unavailable device does become available, a next-in-line access serializer can determine the device is now available for allocation to them.

One of ordinary skill will recognize that the pool of tape drives 204 may be physical tapes drives, virtual tape drives, or a combination of both and can be other computer resources as well. Similarly, the respective allocation requests for the tape drives may come from one application on one computer system and a different application on another computer system, and may also come different applications executing on a single computer system (e.g., computer N 102N).

The environment of FIG. 2 can also include an administrator console 212 that could be located either remotely or locally to one or both of the tape drive pool 204 and the computer systems 102A, 102B, 102N. The administrator console 212 can transmit and receive messages to and from the computer systems 102A, 102B, 102N even though the administrator console 212 may not directly or indirectly access the tape drive pool 204. Although only one tape drive pool 204 and one administrator console 212 are shown in FIG. 2, one of ordinary skill will recognize that more than one of these entities can be provided without departing from the scope of the present disclosure.

Figure 3A:
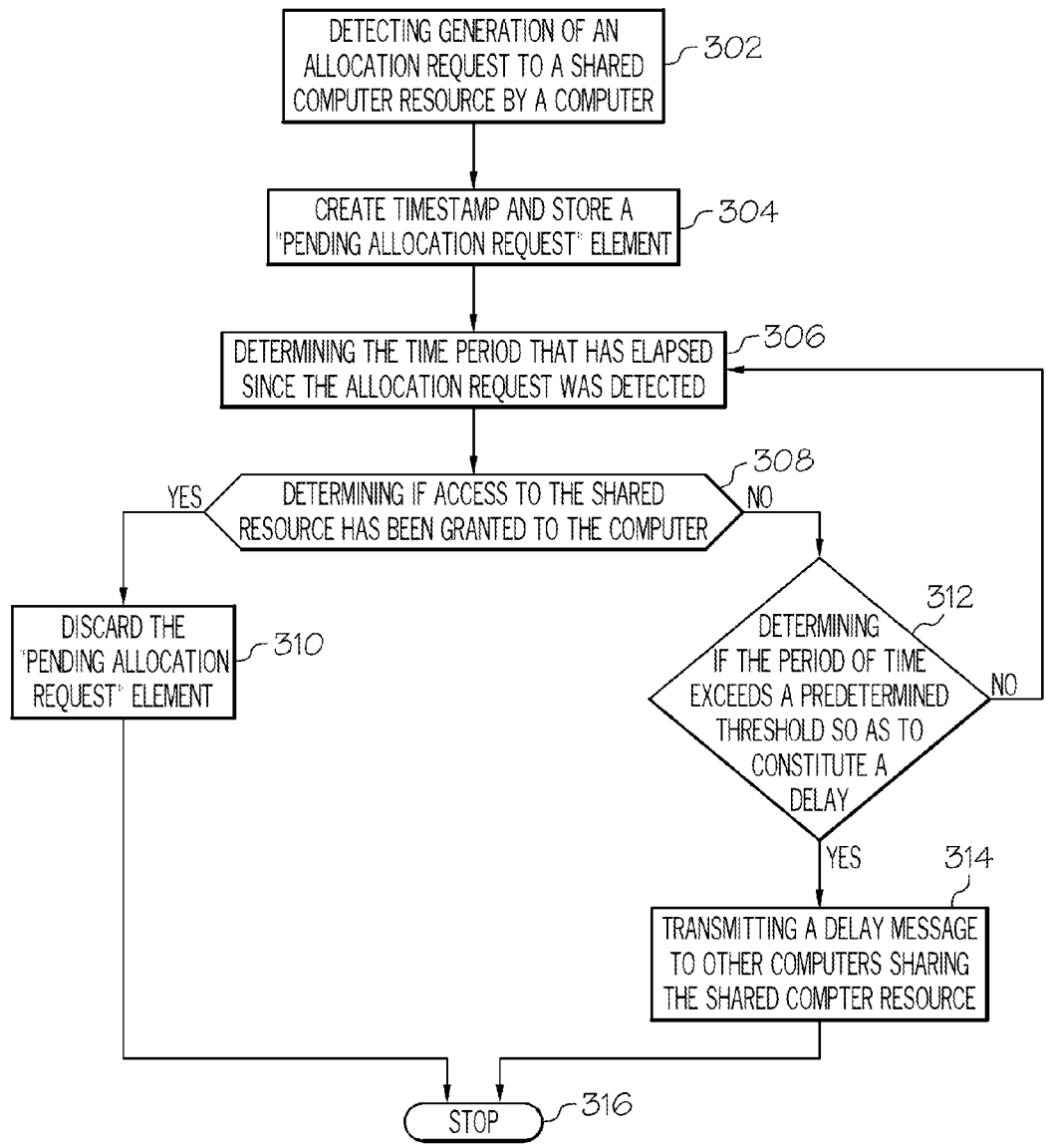
FIG. 3A and FIG. 3B depict a flowchart of example processes for detecting and providing notifications of access delays in accordance with the principles of this disclosure.
Figure 3B:
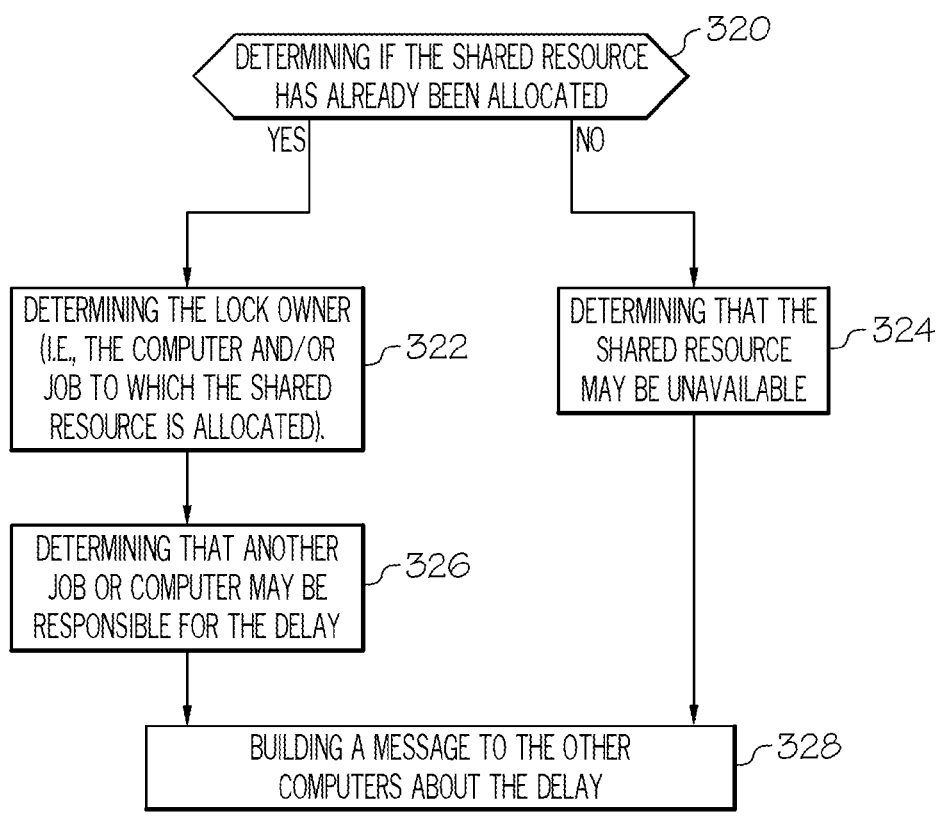

FIG. 3A and FIG. 3B depict a flowchart of example processes for detecting and providing notifications of access delays in accordance with the principles of this disclosure. The steps in the processes of FIGS. 3A and 3B are shown in a particular sequential order. However, one of ordinary skill will recognize that the order of some steps may be different than that shown in the figures, without departing from the scope of the present disclosure. Thus, the flowcharts provided in FIG. 3A and FIG. 3B are intended as examples of how detection and notification of delays on each computer system 102A, 102B, 102N may be accomplished in accordance with the principles of the present disclosure. For example, the respective detection and notification component 110 for each computer system 102A, 102B, 102N may perform the steps depicted in FIG. 3A and FIG. 3B for allocation requests that originate from its respective system 102A, 102B, 102N. Thus, the steps in the processes of FIGS. 3A and 3B are described below from the perspective of a single, example one of the computer systems 102A, 102B, 102N. However, it is to be understood that each of the other computer systems 102A, 102B, 102N are also performing the processes of FIGS. 3A and 3B with respect to allocation requests that respectively originate from each of the computer systems 102A, 102B, 102N As a first step the process on one of the computer systems (e.g., 102A) detects, in step 302, the generation of an allocation request to a shared computer resource by that computer system 102A. A "shared' resource is one that a plurality of computer systems may attempt to exclusively allocate to perform some function. Thus, this resource is shared amongst the plurality of computer systems. Once detection of the request generation occurs, the process creates, time stamps and stores a "pending allocation request" element in step 304. The process on computer 102A, for example, continues, in step 306, by determining a period of time that has elapsed since the allocation request was detected. As described above, this elapsed time period can be considered a delay from when the allocation request was generated by the example computer system 102A. Once this elapsed time period is determined, then the process, in step 308, can determine if access to the shared resource has been granted to the computer system that generated the request, for example computer system 102A.

As an example, a shared resource may have an associated "lock" that is a software token or construct that is associated with the shared resource and is assigned an owner. When ownership of the lock is assigned to a computer system (or a particular job executing on that computer system) then that indicates that the shared resource is currently allocated to that lock owner. Once the current owner is finished with the shared resource, then they can change the owner assigned to the lock in such a way to indicate that the lock can be owned by a next, pending job (if there is one). Thus, in step 302 the detection of the generation of the allocation request on the example computer system 102A can include identifying an identity of the particular computer system or job that generated the request.

This allows, in step 308, a determination to be made as to whether the identity of the request generator matches the current lock owner for the shared resource. If it does match, then access to shared resource has been granted to the request generator and the process on the example computer system 102A can, in step 310 discard the pending allocation request element created in step 304.

If the identity of the request generator does not match the current lock owner of the shared resource, then that shared resource has yet to be allocated to handle the generated request that was detected in step 302. The process on the example computer system 102A can then continue in step 312 by determining if the elapsed time period exceeds a predetermined threshold value. This predetermined value is selected such that a value that exceeds it likely indicates that there may be a problem or malfunction with the shared resource or one of the computer systems attempting to access the shared resource. Any value less than the predetermined threshold likely indicates that the delay is within an acceptable amount that could occur during normal operation of the computer systems.

One of ordinary skill will recognize that this predetermined value may be set by an operator to account for varying computer network environments. For example, the predetermined threshold may be larger when associated with busy shared resources and smaller when associated with less busy shared resources. This predetermined threshold may vary depending on known traffic or access patterns such that it may be different for different days or for different times during a day. The predetermined threshold may also be adjusted based on automatic monitoring of network traffic such that when access to the shared resource increases/decreases then the threshold value may be increased/decreased as well.

In step 312, if the elapsed delay period does not exceed the predetermined threshold, then the process returns to step 306 to repeat a portion of the process. If the elapsed delay period does exceed the predetermined threshold, then in step 314 a delay message can be transmitted by the example computer system 102A to the other computer systems 102B, 102N that share the shared resource. Additionally, the delay message may be transmitted to the system console on the example computer system 102A that requested access to the shared resource as well. The delay message can include a variety of information and can be sent to one or more administrator consoles also. For example, the delay message can include an identification of the computer system and/or job that generated the allocation request. The delay message may also include the length of the elapsed delay period.

The process of FIG. 3A can stop at step 316 once either step 314 or step 310 is completed. However, one alternative is to wait a specified period of time (e.g., one minute) after step 314 completes and then loop from step 314 to step 306. Such an alternative may result in multiple delay messages, however, and may not be desirable under some circumstances.

The delay message that is generated can include different information based on the circumstances that are occurring amongst the different computer systems when the delay happens. Under some circumstances the delay may more likely be caused by a communication problem with the shared resource (e.g., the shared resource is off-line, the shared resource is malfunctioning, a network link is down, etc.). Under other circumstances, the delay may more likely involve another computer system or job that is accessing the shared resource. Thus, the delay message can include information that relates to a probable, or more likely, cause of the delay. Furthermore, in managing access to the shared resource, the respective access serializer on each computer system has access to information about a current lock owner of a shared resource, any delay messages received from other computer systems regarding the shared resource, and how many pending requests are waiting to access the shared resource. Thus, some or all of this information can be included in the delay message that is generated by each computer systems' respective detection and notification component in accordance with the principles of this disclosure.

FIG. 3B depicts steps of a process that can be performed on each of the computer systems 102A, 102B, 102N in addition to those shown in FIG. 3A. For example, the steps 320 through 328 of FIG. 3B could be performed between steps 312 and 314 of FIG. 3A or, alternatively, between step 314 and step 316 of FIG. 3A. As mentioned earlier, the steps of both the figures can be performed in a variety of different sequences to produce a delay message in accordance with the principles of the present disclosure.

In step 320, a determination is made as to whether the shared resource that is the subject of the allocation request (of step 302) has already been allocated to a computer system or job. If not, then in step 324, a determination may optionally be made that the reason for the delay is likely related to the shared resource being unavailable or off-line to all computer systems. This information can be included in the delay message that is transmitted in step 328.

If the shared resource is currently allocated, then in step 322, a determination is made by the process on the example computer system 102A to identify a current lock owner of the shared resource. The lock owner can be identified to be a particular computer system amongst the plurality sharing the shared resource and can even include a specific job on that computer system that owns the lock. In this instance, a determination can be made, in step 326, that a cause of the delay may be associated with the computer system or the job that is the current lock owner. Thus, this information can be included in the delay message that is constructed in step 328 of the process on the example computer system 102A. Useful information that can be included in the delay message may include the identity of the jobs that are pending to access the shared resource or simply the number of jobs that are pending to access the shared resource. Such information can be helpful in identifying an impact that the delay may cause within the computer systems that are sharing the shared resource.

Figure 4:
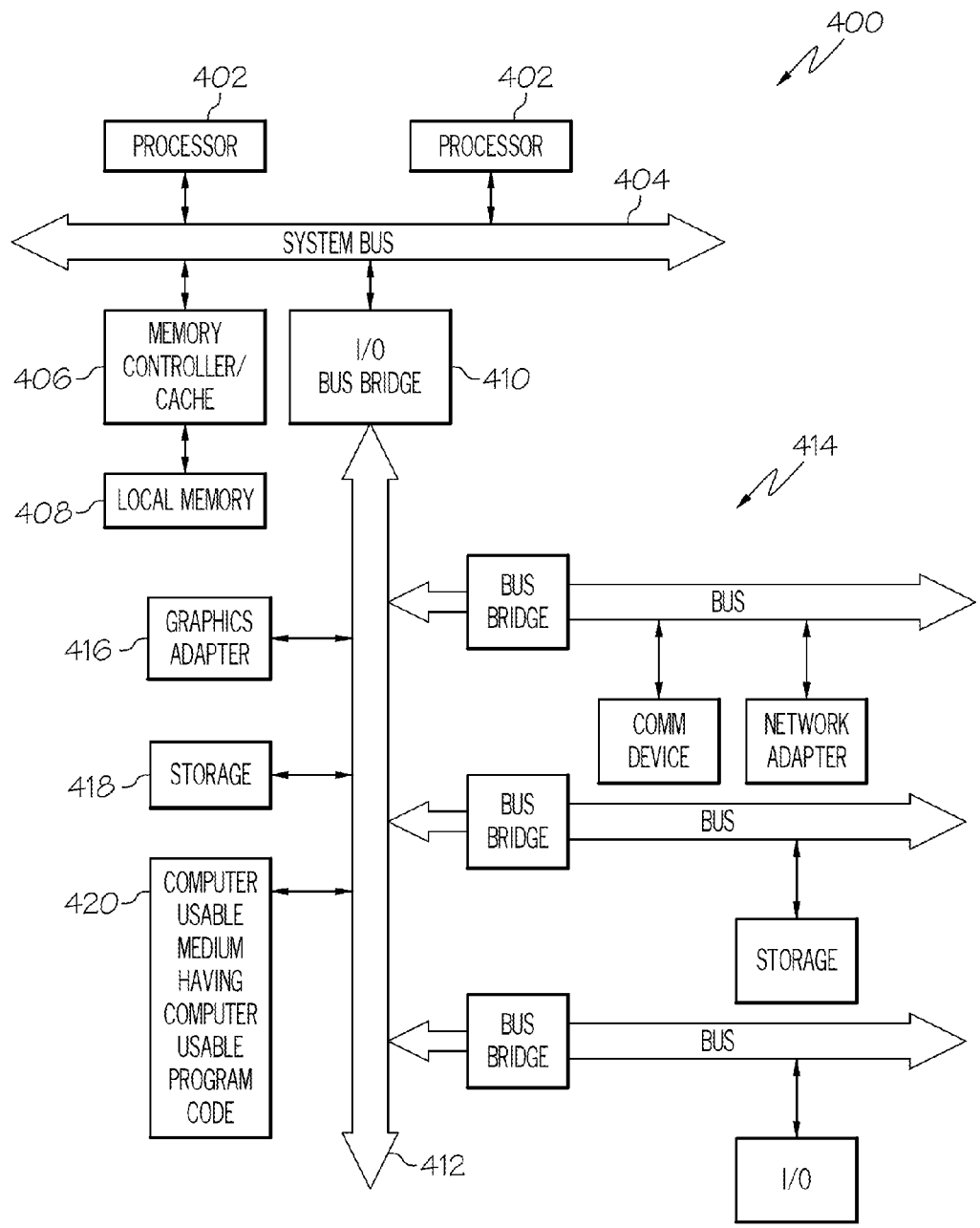
FIG. 4 illustrates a block diagram of a data processing system in accordance with the principles of the present disclosure.

Referring to FIG. 4, a block diagram of a data processing system is depicted in accordance with the present disclosure. A data processing system 400, such as may be utilized to implement the hardware platform 108 or aspects thereof, e.g., as set out in greater detail in FIG. 1-FIG. 3B, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more busses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 3B.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method of managing computer resource allocation comprising:
   detecting, by one computer amongst a plurality of computers, generation of an allocation request, wherein the allocation request requests exclusive access, by the one computer, to a computer resource shared between the plurality of computers;
   determining, by the one computer, a period of time that has elapsed since detection of the generation of the allocation request;
   determining, by the one computer, a delay has occurred when the period of time has exceeded a predetermined threshold; and
   transmitting, by the one computer, a delay message based on the delay to each of the plurality of computers.

2. The method of claim 1, wherein the delay message comprises an identification of the one computer and the computer resource.

3. The method of claim 1, wherein the computer resource comprises a serially accessed storage device.

4. The method of claim 3, wherein the serially accessed storage device comprises one of a plurality of physical tape devices.

5. The method of claim 3, wherein the serially accessed storage device comprises one of a plurality of virtual tape devices.

6. The method of claim 1, comprising:
   determining, by the one computer, a lock owner comprising a particular computer of the plurality of computers that currently owns a lock on the computer resource.

7. The method of claim 6, wherein the delay message comprises an identification of the one computer and an identification of the lock owner.

8. The method of claim 7, wherein:
   the identification of the lock owner comprises an identification of a first job executing on the particular computer and granted access to the computer resource; and
   the identification of the one computer comprises an identification of a second job executing on the one computer requesting access to the computer resource.

9. The method of claim 8, comprising:
   transmitting, by the one computer, a notification message to administrative personnel associated with the plurality of computers, wherein the notification message comprises the identification of the first job, the identification of the second job, and an indication of the time period.

10. The method of claim 1, comprising:
    determining, by the one computer, a possible cause for the delay; and
    wherein the delay message comprises an identification of the possible cause.

11. The method of claim 1, comprising:
    receiving, by the one computer, an external delay message from another one of the plurality of computers; and
    displaying, by the one computer, the external display delay message.

12. The method of claim 1, wherein the steps of detecting generation of an allocation request, determining a period of time has elapsed; determining a delay has occurred; and transmitting a delay message are respectively performed by each of the plurality of computers.

13. A computer program product for managing computer resource allocation, comprising:
    a non-transitory computer readable storage medium having computer readable program code embodied therewith, the computer readable program code comprising:
    computer readable program code configured to detect, by one computer amongst a plurality of computers, generation of an allocation request, wherein the allocation request requests exclusive access, by the one computer, to a computer resource shared between the plurality of computers;
    computer readable program code configured to determine a period of time that has elapsed since detection of the generation of the allocation request;
    computer readable program code configured to determine a delay has occurred when the period of time has exceeded a predetermined threshold; and
    computer readable program code configured to transmit a delay message based on the delay to each of the plurality of computers.

14. The computer program product of claim 13, wherein the delay message comprises an identification of the one computer and the computer resource.

15. The computer program product of claim 13, wherein the computer resource comprises a serially accessed storage device.

16. The computer program product of claim 15, wherein the serially accessed storage device comprises one of a plurality of physical tape devices.

17. The computer program product of claim 15, wherein the serially accessed storage device comprises one of a plurality of virtual tape devices.

18. The computer program product of claim 13, comprising:
computer readable program code configured to determine a lock owner comprising a particular computer of the plurality of computers that currently owns a lock on the computer resource.

19. The computer program product of claim 18, wherein the delay message comprises an identification of the one computer and an identification of the lock owner.

20. The computer program product of claim 19, wherein:
the identification of the lock owner comprises an identification of a first job executing on the particular computer and granted access to the computer resource; and
the identification of the one computer comprises an identification of a second job executing on the one computer requesting access to the computer resource.

21. The computer program product of claim 20, comprising:
computer readable program code configured to transmit a notification message to administrative personnel associated with the plurality of computers, wherein the notification message comprises the identification of the first job, the identification of the second job, and an indication of the time period.

22. The computer program product of claim 13, comprising:
computer readable program code configured to determine a possible cause for the delay, wherein the delay message comprises an identification of the possible cause.

23. The computer program product of claim 13, comprising:
computer readable program code configured to receiving an external delay message from another one of the plurality of computers; and
computer readable program code configured to display the external display delay message.

24. A system for managing computer resource allocation comprising:
a processor coupled with a memory;
said memory comprising code executable by the processor, said code configured, when executed, to manage computer resource allocation by:
detecting, by one computer amongst a plurality of computers, generation of an allocation request, wherein the allocation request requests exclusive access, by the one computer, to a computer resource shared between the plurality of computers;
determining, by the one computer, a period of time that has elapsed since detection of the generation of the allocation request;
determining, by the one computer, a delay has occurred when the period of time has exceeded a predetermined threshold; and
transmitting, by the one computer, a delay message based on the delay to each of the plurality of computers.

25. The system of claim 24, wherein the delay message comprises an identification of the one computer and the computer resource.

26. The system of claim 24, wherein the computer resource is a serially accessed storage device.

27. The system of claim 26, wherein the serially accessed storage device is one of a plurality of physical tape devices.

28. The system of claim 26, wherein the serially accessed storage device is one of a plurality of virtual tape devices.

29. The system of claim 24, wherein:
said memory further comprises code executable by the processor, said code configured, when executed, to determine, by the one computer, a lock owner comprising a particular computer of the plurality of computers that currently owns a lock on the computer resource.

30. The system of claim 29, wherein the delay messages comprises an identification of the one computer and an identification of the lock owner.

31. The system of claim 30, wherein:
the identification of the lock owner comprises an identification of a first job executing on the particular computer and granted access to the computer resource; and
the identification of the one computer comprises an identification of a second job executing on the one computer requesting access to the computer resource.

32. The system of claim 31, comprising:
a transmitter configured to transmit a notification message to administrative personnel associated with the plurality of computers, wherein the notification message comprises the identification of the first job, the identification of the second job, and an indication of the time period.

33. The system of claim 24, said memory further comprises code executable by the processor, said code configured, when executed, to determine, by the one computer, a possible cause for the delay, wherein the delay message comprises an identification of the possible cause.

34. The system of claim 24, said memory further comprises code executable by the processor, said code configured, when executed, to:
receive, by the one computer, an external delay message from another one of the plurality of computers; and
display, by the one computer, the external display delay message.

* * * * *